United States Patent [19]

Denzinger et al.

[11] Patent Number: 4,774,303

[45] Date of Patent: Sep. 27, 1988

[54] PREPARATION OF POLYMERS OF ACRYLIC ACID OR METHARCYLIC ACID

[75] Inventors: Walter Denzinger, Speyer; Heinrich Hartmann, Limburgerhof; Guenter Hirsch, Mutterstadt; Hans-Werner Becker, Ludwigshafen; Michael Rohmann, Bad Duerkheim, all of Fed. Rep. of Germany

[73] Assignee: BASF Aktiengesellschaft, Rheinland-Pfalz, Fed. Rep. of Germany

[21] Appl. No.: 8,553

[22] Filed: Jan. 29, 1987

[30] Foreign Application Priority Data

Feb. 5, 1986 [DE] Fed. Rep. of Germany ....... 3603392

[51] Int. Cl.⁴ .................................................. C08F 2/00
[52] U.S. Cl. .................. 526/212; 526/317.1; 526/233
[58] Field of Search ....................... 526/233, 212, 317.1

[56] References Cited

U.S. PATENT DOCUMENTS

| | | | |
|---|---|---|---|
| 2,576,720 | 11/1951 | Marks | 526/233 |
| 3,787,488 | 1/1974 | Greenfield | 260/537 S |
| 4,209,398 | 6/1980 | Ii et al. | 210/701 |
| 4,301,266 | 11/1981 | Muenster et al. | 526/212 |
| 4,499,002 | 2/1985 | Masler, III et al. | 524/555 |
| 4,534,866 | 8/1985 | Becker | 252/181 |
| 4,639,490 | 1/1987 | Masler, III et al. | 524/767 |
| 4,640,793 | 2/1987 | Persinski et al. | 524/375 |

FOREIGN PATENT DOCUMENTS

| | | | |
|---|---|---|---|
| 4928672 | 7/1974 | Japan | 526/233 |
| 578849 | 7/1946 | United Kingdom | 526/233 |

*Primary Examiner*—Joseph L. Schofer
*Assistant Examiner*—N. Sarofim
*Attorney, Agent, or Firm*—Oblon, Fisher, Spivak, McClelland & Maier

[57] ABSTRACT

Polymers of acrylic acid or methacrylic acid are prepared by polymerizing acrylic acid and/or methacrylic acid at 50°–180° C. in a $C_2$–$C_6$-alcohol or mixtures thereof with water having a $C_2$–$C_6$-alcohol content of not less than 40% by weight in the presence of free radical polymerization initiators and from 0.01 to 5% by weight, based on the monomers used, of inorganic acids of phosphorus in which the phosphorus has an oxidation number of from 1 to 4, or of water-soluble salts thereof, water-soluble —$PO(OH)_2$-containing compounds and/or water-soluble salts thereof. The polymers thus prepared are effective milling aids and dispersants for pigments for producing aqueous pigment slurries for use in paper-coating compositions.

8 Claims, No Drawings

PREPARATION OF POLYMERS OF ACRYLIC ACID OR METHARCYLIC ACID

European Pat. No. 2,771 discloses a process for preparing polymers of acrylic acid or methacrylic acid wherein acrylic acid or methacrylic acid, if desired together with up to 10% by weight of another ethylenically unsaturated compound copolymerizable therewith, is polymerized under superatmospheric pressure at 120°–200° C. in isopropanol or mixtures thereof with water of not less than 40% by weight isopropanol content in the presence of free radical polymerization initiators. This process reproducibly gives, even on an industrial scale, polymers of low molecular weight which are used as dispersants for inorganic pigments for producing paper-coating compositions. Although the low molecular weight polymers thus prepared have a very powerful dispersing action on inorganic pigments, their activity when used as milling aids leaves something to be desired.

It is an object of the present invention to provide a process for preparing polymers which are usable as dispersants for inorganic pigments and similarly as milling aids for inorganic pigments, in particular calcium carbonate, for producing highly concentrated pigment slurries for use in paper-coating compositions.

We have found that this object is achieved with a process for preparing polymers of acrylic acid or methacrylic acid by polymerizing acrylic acid and/or methacrylic acid, if desired together with up to 10% by weight of another ethylenically unsaturated compound copolymerizable therewith at 40°–180° C. in a $C_2$–$C_6$-alcohol or mixtures thereof with water with a $C_2$–$C_6$ alcohol content of not less than 40% by weight, in the presence of free radical polymerization initiators, when the polymerization is carried out in the presence of from 0.01 to 5% by weight, based on the monomers used, of an inorganic acid of phosphorus where the phosphorus has an oxidation number of from 1 to 4, a water-soluble salt thereof, a water-soluble —$PO(OH)_2$-containing compound and/or a water-soluble salt thereof. The polymerization is preferably carried out under superatmospheric pressure at 90°–130° C. in isopropanol and/or sec.-butanol or in a mixture with water which contains not less than 40% by weight of isopropanol and/or sec.-butanol in the presence of phosphorous acid and/or a water-soluble —$PO(OH)_2$-containing compound. The polymers obtainable thereby are used as milling aids and dispersants for inorganic pigments and also as milling aids, in particular for calcium carbonate, for producing highly concentrated pigment slurries for use in paper-coating compositions.

The products of the process according to the invention are milling aids and dispersants based on acrylic acid or methacrylic acid. To this end, acrylic acid, methacrylic acid or mixtures of acrylic acid and methacrylic acid are subjected to polymerization. Mixtures of acrylic acid and methacrylic acid can be copolymerized with each other in any desired ratio. The polymerization of acrylic acid and/or methacrylic acid can also be carried out in the presence of another ethylenically unsaturated compound copolymerizable therewith. The comonomer used is chiefly of the type which results in still water-soluble polymers. Examples of comonomers which are copolymerizable with acrylic acid and methacrylic acid are esters thereof with monohydric alcohols of 1 to 8 carbon atoms, dicarboxylic acids, such as fumaric acid, maleic acid or itaconic acid, and monoesters or diesters of the dicarboxylic acids mentioned with monobasic $C_1$-$C_8$-alcohols, acrylonitrile, methacrylonitrile, acrylamide and methacrylamide. Other suitable comonomers are, for example, vinyl acetate, vinyl propionate, vinyl butyrate, 2-acrylamido-2-methylpropanesulfonic acid, vinylsulfonic acid, allylsulfonic acid and vinylphosphonic acid. The comonomers are used in an amount of up to 10% by weight. However, if comonomers are used, care must always be taken to ensure that the copolymers obtained are still water-soluble. Particular preference is given to the preparation of homopolymers of acrylic acid and of copolymers of acrylic acid with up to 10% by weight of vinylphosphonic acid (preferably from 2 to 5% by weight) under the above-mentioned conditions.

The polymerization is carried out in a $C_2$–$C_6$-alcohol or in a mixture thereof with water which contains not less than 40% by weight of the alcohol. Suitable alcohols are ethanol, n-propanol, isopropanol, n-butanol, isobutanol, tert.-butanol, pentanol, isopentanol, neopentyl alcohol, n-hexanol, sec.-hexanol and cyclohexanol. Of particular importance for use as solvents for the preparation of the polymers are secondary alcohols, of which the use of isopropanol and sec.-butanol is particularly preferred. The alcohols can be used either alone or in the form of mixtures with any desired mixing ratio. Of particular industrial interest is the polymerization in mixtures of the alcohols mentioned with water, these mixtures containing of an alcohol or of a mixture of a plurality of suitable alcohols.

The polymerization takes place in the presence of a free radical initiator. This free radical initiator is selected from among the customarily used persulfates, peroxides, hydroperoxides and azo compounds. Specific examples of such initiators are sodium persulfate, potassium persulfate, ammonium persulfate, tert.-butyl perpivalate, tert.-butyl per-2-ethylhexanoate, tert.-butyl perneodecanoate, benzoyl peroxide, di-tert.-butyl peroxide, tert.-butyl hydroperoxide, 2-ethylhexyl percarbonate, hydrogen peroxide, 2,2-azobisisobutyronitrile, 2,2-azobis(4'-methoxy-2,4-dimethylvaleronitrile), 2,2'-azobis(2,4-dimethylvaleronitrile), dimethyl 2,2-azobisisobutyrate, 2,2'-azobis(2,4,4-trimethylpentane), 2,2'-azobis(N,N'-dimethyleneisobutyramide) dihydrochloride, 2,2'-azobis(2-amidinopropane) dihydrochloride and 4,4'-azobis(4-cyanopentanecarboxylic acid). Suitable initiators for preparing the polymers also include the known redox initiators and UV initiators. A polymerization by the action of UV rays is carried out in the presence of the customary photoinitiators or sensitizers. These are for example alpha-ketaldonyl alcohols, such as benzoin and benzoin ether, alpha-substituted benzoin compounds, such as alpha-methylolbenzoin and alpha-methylolbenzoin ether, alpha-methylbenzoin or alpha-phenylbenzoin, including triplet sensitizers. The preferred UV initiators are benzyl diketals. The UV radiation sources used in addition to high-energy UV-emitting lamps, such as carbon arc lamps, mercury vapor lamps, xenon lamps or fluorescent tubes, also include for example low-UV light sources such as fluorescent tubes with a high blue content.

The preferred polymerization initiator for production of the milling aids and dispersants on an industrial scale is hydrogen peroxide. The initiator is used in an amount of from 0.1 to 5, preferably from 0.5 to 4, % by weight, based on the monomers.

According to the invention, the polymerization is carried out in the presence of an inorganic acid of phosphorous where the phosphorus has an oxidation number of from 1 to 4, a water-soluble salt thereof, a water-soluble —PO(OH)$_2$-containing compound and/or a water-soluble salt thereof. Examples of suitable water-soluble inorganic phosphorus compounds are hypophosphorous acid and the sodium and potassium salts thereof, hypodiphosphorous acid, sodium hypodiphosphite, phosphorous acid, monosodium phosphite, disodium phosphite, diphosphorous acid and sodium diphosphite, hypodiphosphorous acid and sodium hypodiphosphite. Of this group of inorganic phosphorus compounds, preference is given to phosphorous acid and the sodium, potassium and ammonium salts thereof.

Water-soluble —PO(OH)$_2$-containing compounds can also be referred to as organophosphonic acids, which are for example: methanediphosphonic acid, propane-1,2,3-triphosphonic acid, butane-1,2,3,4-tetraphosphonic acid, polyvinylphosphonic acid, 1-aminoethane-1,1-diphosphonic acid, 1-amino-1-phenyl-1,1-diphosphonic acid, aminotrismethylenetriphosphonic acid, methylaminobismethylenediphosphonic or ethylaminobismethylenediphosphonic acid, ethylenediaminotetramethylenetetraphosphonic acid, ethylenetriaminopentamethylenepentaphosphonic acid, 1-hydroxyethane-1,1-diphosphonic acid, phosphonoacetic or phosphonopropionic acid and salts thereof, preference being given to 1-hydroxy-1,1-diphosphonic acid and the disodium and tetrasodium salts thereof, aminotrismethylenetriphosphonic acid and the pentasodium salt thereof and ethylenediaminotetramethylenetetraphosphonic acid and salts thereof. Frequently it is advantageous to combine more than one phosphorus compound, for example sodium hypophosphite and phosphorous acid, phosphorous acid and disodium 1-hydroxyethylidene-1,1-diphosphonate and aminotrimethylene-triphosphonic acid and 1-hydroxyethane-1,1-dphosphonic acid. They can be mixed with one another and used in the polymerization in any desired ratio.

The amounts added weigh from 0.01 to 5% by weight, based on monomers used, the range from 0.1 to 1% by weight being particularly preferred.

Aqueous solutions of homopolymers are in general prepared by first introducing water and a small amount of the monomer (from 2 to 5% of the total amount of monomer which is to be polymerized) into the reactor, flushing with nitrogen, and heating the reactor contents to the desired polymerization temperature. The rest of the monomer is then added together with the initiator as a solution in water and/or an alcohol in the course of from 1 to 10 hours, preferably in the course of from 2 to 8 hours. The phosphorus compounds are preferably introduced first into the reactor, but they can also be added in the aqueous monomer solution or separately therefrom. In some cases it is of advantage to introduce about 10% of the phosphorus compounds into the reactor as part of the first charge and to add the remainder continuously together with the monomers.

The polymerization temperature ranges from 40° to 180° C. If the selected polymerization temperature is above the boiling point of the alcohol used in the particular case, the polymerization is carried out under superatmospheric pressure. Polymers having particularly advantageous properties are obtained when the polymerization is carried out at 90°–130° C. under superatmospheric pressure. The polymerization can be carried out batchwise or continuously. The polymerization can also be effected by first introducing the monomers to be polymerized, the solvent, the initiator and one of the phosphorus compounds described above and, preferably in a nitrogen atmosphere, irradiating the mixture with UV light. If the polymerization is carried out by means of UV radiation, the polymerization temperature is within the range from 40° to 90° C. In the polymerization of acrylic acid and/or methacrylic acid, it is also possible to introduce first a portion of the alcohol and raise it to the polymerization temperature and then to meter in acrylic acid or methacrylic acid, the initiator and further solvents. The phosphorus compounds in question are preferably introduced first or added continuously or batchwise to the polymerization reactor.

The polymerization is in general performed by first introducing only a portion of the acrylic acid and of a mixture of water and isopropanol or sec.-butanol, and also polymerization initiator, and then heating the reaction mixture under superatmospheric pressure to a temperature within the range from 90° to 130° C. and starting the polymerization. This is followed by the continuous or batchwise addition of solvent, acrylic acid and polymerization initiator and, as the case may be, one of the suitable phosphorus compounds, unless already introduced into the polymerization reactor as part of the initial charge. The polymerization pressure depends on the reaction temperature chosen. The pressure ranges from about 2 to 20, preferably from 2 to 5, bar, but in some cases can also be higher or lower.

After the entire monomer mixture has been added to the polymerization vessel, the reaction mixture is additionally heated for from 2 to 3 hours at from 90° to 130° C., and thereafter the pressure in the polymerization vessel is reduced while at the same time a mixture of water and isopropanol or sec.-butanol is distilled off. Isopropanol or sec.-butanol and water are removed from the reaction mixture either under atmospheric pressure or preferably under reduced pressure. The distillation is discontinued as soon as no or only very little isopropanol or sec.-butanol is left in the reaction mixture. Advantageously the pressure is gradually let down to atmospheric pressure when the reaction has ended; during the letting down the bulk of the isopropanol/water or of the sec.-butanol/water mixture distills off. Subsequently the pressure in the reaction vessel is gradually further reduced with continued stirring until the bulk of secondary alcohol has passed over together with the water. Water is then added to the residue and thereafter aqueous sodium hydroxide solution to give an aqueous solution of a sodium polyacrylate or methacrylate. Instead of sodium hydroxide solution it is also possible to use potassium hydroxide solution, ammonia or an amine. The polyacrylate solution is in general brought to pH 8.0–9.0.

The concentrations of monomer in the solvent are chosen in such a way as to give polymer solutions having a polymer content of from 5 to 70, preferably from 10 to 60, % by weight. At low polymerization temperatures it is preferable to prepare polymer solutions of a relatively low concentration, while highly concentrated polymer solutions are produced at higher polymerization temperatures. The polymers prepared by the process according to the invention have a Fikentscher K value of from 15 to 50, preferably from 18 to 40 (measured at 25° C. in 1% aqueous solution in the form of the sodium salt at pH 8.5).

The copolymers prepared by the process according to the invention are used as milling aids and dispersants for pigments for producing paper-coating compositions, which requires highly concentrated aqueous pigment slurries. The polymers are used in an amount, based on pigment, of from 0.05 to 1.5, preferably from 0.3 to 0.7, % by weight. Suitable pigments for producing paper-coating compositions are chiefly chalk, clay from primary and secondary deposits, satin white, titanium dioxide, kaolin and dolomite. These pigments for coating paper are made up into highly concentrated aqueous slurries which, depending on the nature of the pigment and of the particle size thereof, can have solids contents of up to 90% by weight in some instances. The solids contents of clay slurries range from 65 to 70% by weight, while in the case of chalk the solids content of the aqueous slurries ranges from 75 to 85% by weight, in some instances even up to 90% by weight, in particular in the case of pigments having a wide particle size spectrum. The customary coating pigments which come from natural deposits, such as kaolinites, calcium carbonates, talcum and gypsum, and white pigments as products of chemical processes, must frequently be milled and dispersed to be of sufficient fineness for use in paper-coating compositions. This applies in particular to calcium carbonates.

The aqueous pigment slurries are preferably prepared by adding the polymers prepared by the process according to the invention as early as the milling stage to act as milling aids for the pigments. This milling process is, as is known, carried out in an aqueous medium. Chalk is milled for example until 90% has a particle size of less than 2 $\mu$m. In the case of clay, the particle size of 85% of the pigment is less than 2 $\mu$m. The dispersant otherwise used in the production of paper-coating compositions can be used in the milling process as a milling aid. The milling aids are used in the same amount as the dispersants for producing paper-coating compositions. Milling and/or dispersing chalk preferably requires from 0.3 to 0.7% by weight of the polymers described above. In the preparation of aqueous slurries of chalk, even small amounts of the polymer prepared according to the invention exhibits a significantly better dispersibility than the commercially available products hitherto used for this purpose, which are prepared in the absence of the phosphorus compounds described above. For the purposes of the present invention, highly concentrated aqueous pigment slurries are mixtures where the pigment content is not less than 65% by weight. In the Examples, the parts and percentages are by weight. The K values were measured by the method of Fikentscher (Cellulose Chemie 13 (1932), 48–64 and 71–74) at 25° C. in 1% strength aqueous solution at pH 8.5, K being k×10$^3$.

The viscosity of the aqueous pigment slurries was determined with a Brookfield viscometer at 20° C. and 100 rpm. using spindle IV.

EXAMPLE 1

A 6 l capacity pressure vessel which is equipped with a stirrer, a heating jacket and metering and distillation attachments is charged with 1,048 g of a 65% strength aqueous isopropanol solution, 59 g of 30% strength hydrogen peroxide and 19 g of a 50% strength aqueous solution of phosphorous acid, is thoroughly flushed with nitrogen and, after sealing, is heated to 118° C., the pressure rising to 3.2 bar. As soon as the contents of the pressure vessel have reached a temperature of 118° C., a solution of 1,895 g of acrylic acid and 908 g of a mixture of water and isopropanol with an isopropanol content of 65% are added in the course of 3 hours, while 100 g of 30% strength hydrogen peroxide are added seperately in the course of 4 hours. After all the hydrogen peroxide solution has been added, the reaction mixture is maintained at 118° C. for a further 2 hours. It is then cooled down to 100° C. and let down, so that an isopropanol/water mixture distills off. Steam is then passed into the reaction mixture to remove as much isopropanol as possible by distillation. As soon as all the isopropanol has been distilled off, the reaction mixture is cooled down to 60° C. and is brought to pH 8.5 by adding 50% strength aqueous sodium peroxide solution. In this way an aqueous solution of sodium polyacrylate having a solids content of 45% is obtained. The K value of the polymer is 26.6.

EXAMPLE 2

Example 1 is repeated, except that the 19 g of 50% strength aqueous phosphorous acid are reduced to 11.4 g and the acrylic acid is metered in over 5 hours and the 30% strength aqueous hydrogen peroxide solution over 7 hours, affording a 45% strength aqueous solution of the sodium polyacrylate with a polymer K value of 24.4.

EXAMPLE 3

In a 2 l quartz glass flask which is equipped with a stirrer, thermometer and reflux condenser, 750 g of isopropanol, 190 g of acrylic acid, 1.9 g of a 50% strength aqueous solution of phosphorous acid and 1.9 g of benzyl diketal are irradiated with high-energy UV light from a mercury vapor lamp. In the course of irradiation for about a quarter of an hour the reaction mixture heats up to the boil at about 82° C. Irradiation is continued for 7 hours during which occasional cooling of the flask in a waterbath ensures that the reaction does not become overvigorous. Thereafter the UV lamp is switched off, and the reaction mixture is worked up by passing in steam to distill the isopropanol out of the reaction mixture. The reaction mixture is diluted with water, and the polyacrylic acid formed is neutralized with 50% aqueous sodium hydroxide solution to a pH of 8.3. The solids content of the aqueous solution of sodium polyacrylate is 47%. The sodium polyacrylate has a K value of 32.5.

EXAMPLE 4

Example 1 is repeated, except that the 65% strength aqueous isopropanol solution is replaced with a mixture of sec.-butanol and water which has a sec.-butanol content of 85%, affording an aqueous sodium polyacrylate solution having a solids content of 45% and a polymer K value of 28.2.

COMPARATIVE EXAMPLE 1

(similar to Example 1 of European Pat. No. 2,771)

A 15 l capacity pressure vessel which is equipped with a stirrer, a heating jacket and metering and distillation attachments is charged with 1,600 g of 58% strength aqueous isopropanol and 96 g of 50% strength hydrogen peroxide. The pressure vessel is sealed, and the contents are heated to 130° C. The pressure is 4 bar. When the temperature of 130° C. is reached, a mixture of 5000 g of acrylic acid and 3,700 g of 58% strength aqueous isopropanol is added in the course of 6 hours, and 200 g of 50% strength hydrogen peroxide are added in the course of 8 hours by means of a seperate metering device. After all the hydrogen peroxide has been added, the reaction mixture is maintained at 130° C. for a further 2 hours, is then cooled down to 100° C. and has steam passed into it to distill off the isopropanol. By adding water and aqueous sodium hydroxide solution a ready-to-use solution of a sodium polyacrylate of pH 8.5 is obtained. The solution contains 45% of sodium polyacrylate, the K value of the polymer being 19.6.

COMPARATIVE EXAMPLE 2

(in accordance with U.S. Pat. No. 3,787,488)

A 6 l capacity pressure vessel which is equipped with a stirrer, a heating jacket and metering means is charged with 1,040 g of demineralized water and 50 g of acrylic acid, and the mixture is heated to 80° C. in a slow stream of nitrogen. 2 different feeds are prepared, the first feed comprising 2,000 g of acrylic acid, 205 g of 2-mercaptoethanol and 250 g of water and the second feed a solution of 60 g of ammonium persulfate in 300 g of water. The two feeds are added separately in the course of 4 hours. The polymerization is carried out during this period of 80° C. When all the monomers and initiator have been added, polymerization is continued at 100° C. for a further 1.5 hours, and the reaction mixture is then cooled down to 60° C. and is neutralized with 1,350 g of a 50% strength aqueous sodium hydroxide solution. The K value of the sodium polyacrylate is 18.

Application Examples

EXAMPLE 5

To test the efficacy of the polymers prepared as described in Examples 1 to 4 and Comparative Examples 1 and 2, they were subjected to a test of their suitability for use as milling aids.

The test method adopted was as follows: A mixture of 300 g of calcium carbonate, 100 g of water and 1.5 g of the milling aid under test (the sodium polyacrylates described above were used in each case, the stated quantities being based on the solids content of the polymer solution) was ball-milled at 2,000 rpm. for 60 minutes in a ball mill (eg. a Netzsch PE 5 mill) with a ball content of 170% by weight, based on the total pigment slurry. 0.3 g of milling aid is then metered into the batch, and the mixture is milled for a further 30 minutes. 28 g of water are then added, and the completed pigment slurry thus obtained is separated from the balls. The viscosity of the 70% strength pigment slurry thus obtained and the particle size of the pigment is then determined. The particle size is determined in a conventional manner (Sedigraph, Joice-Löbel disk centrifuge) in terms of a percentage smaller than 2 $\mu$m and smaller than 1 $\mu$m. The particle sizes and viscosities determined in each case on using the polymers obtained in the Examples and Comparative Examples as milling aids are shown in the Table.

| Milling aid Polymer prepared in Example | Characterization of pigment slurry | | Viscosity using Brookfield at 100 rpm/ spindle IV [mPas] |
|---|---|---|---|
| | Particle size | | |
| | % <1 $\mu$m | % <2 $\mu$m | |
| 1 | 82.0 | 97.2 | 1,800 |
| 2 | 82.3 | 94.5 | 2,250 |
| 3 | 81.8 | 97.3 | 2,300 |
| 4 | 82.2 | 95.0 | 2,100 |
| Comparative Example 1 | 82.0 | 94.5 | 4,500 |
| Comparative Example 2 | 81.8 | 94.0 | 5,700 |

When the pigment slurries have a particle size of around 82% less than 1 $\mu$m and from 94 to 97% smaller than 2 $\mu$m the 70% strength calcium carbonate slurries of the invention have viscosities of around 2,000 mPas, while the polymers obtained in Comparative Examples 1 and 2 give pigment slurry viscosities of over 4,000 mPas.

On shortening the milling time in the case of the product obtained on using the polymer of Comparative Example 1 to such an extent that the pigment slurry has a viscosity of around 1,800 mPas, qualitatively worse, namely coarsely divided, pigment slurries are obtained: 74.5% smaller than 1 $\mu$m and 89.8% smaller than 2 $\mu$m. The products prepared according to the invention are highly effective not only as milling aids but also in the conventional dispersing of any customary paper-coating pigment. They are thus suitable for use not only as milling aids but also as dispersants for pigments.

We claim:

1. A process for preparing a polymer of acrylic acid or methacrylic acid by polymerizing acrylic acid, methacrylic acid, or mixtures thereof, if desired together with up to 10% by weight of another ethylenically unsaturated compound copolymerizable therewith, at 40°–180° C. in a secondary $C_2$–$C_6$-alcohol or a mixture thereof with water with a $C_2$–$C_6$-alcohol content of not less than 40% by weight in the presence of a free radical polymerization initiator and of from 0.01 to 5% by weight, based on the monomers used, of an inorganic acid of phosphorhus in which the phosphorus has an oxidation number of from 1–4, a water-soluble salt thereof, a water-soluble —PO(OH)$_2$-containing compound, a water-soluble salt thereof, or mixtures thereof.

2. The process as claimed in claim 1, wherein the water-soluble —PO(OH)$_2$-containing compound used in aminotrismethylenetriphosphonic acid, ethylenediaminetetramethylenetetraphosphonic acid, ethylenetriaminepentamethylenephosphonic acid and/or 1-hydroxyethane-1,1-diphosphonic acid.

3. The process as claimed in claim 1, wherein acrylic acid is polymerized in isopropanol or a mixture thereof with water having an isopropanol content of not less than 40% by weight in the presence of from 0.1 to 1% by weight, based on acrylic acid, of phosphorous acid or an alkali metal or ammonium salt thereof.

4. The process as claimed in claim 1, wherein the polymerization is conducted in isopropanol, secbutanol, or mixtures thereof with water such that the polymerization medium has a secondary alcohol content of not less than 40% by weight, in the presence of a phosphorus acid, a water-soluble-PO(OH)$_2$-containing compound, or mixtures thereof at 90°–130° C. under superatmospheric pressure.

5. The process as claimed in claim 1, wherein said ethylenically unsaturated compound copolymerizable with said acid is an acrylic acid or methacrylic acid ester formed from a monohydric alcohol of 1–8 carbon atoms, a dicarboxylic acid, a monoester of said dicarboxylic acid, a diester of said dicarboxylic acid, both of said esters being formed from $C_1$–$C_8$ monohydric alcohols, acrylonitrile, methacrylonitrile, acrylamide, methacrylamide, vinyl acetate, vinyl propionate, vinyl butyrate, 2-acrylamido-2-methylpropanesulfonic acid, vinylsulfonic acid, allylsulfonic acid or vinylphosphonic acid.

6. The process as claimed in claim 1, wherein said inorganic acid of phosphorus or water-soluble salt thereof is hypophosphorous acid, the sodium or potassium salt thereof, hypodiphosphorous acid, sodium hypodisphosphite, phosphorous acid, monosodium phosphite, disodium phosphite, diphosphorous acid, sodium diphosphite, hypodiphosphorous acid or sodium hypodiphosphite.

7. The process as claimed in claim 1, wherein the amount of said inorganic phosphorous acid employed ranges from 0.1–1% by weight, based on the monomers employed.

8. The process as claimed in claim 1, wherein said polymer product has a Fikentscher K value ranging from 15–50 as measured at 25° C. in a 1% aqueous solution in the form of a sodium salt at pH of 8.5.

* * * * *